US006628953B1

(12) United States Patent
Dillon et al.

(10) Patent No.: US 6,628,953 B1
(45) Date of Patent: Sep. 30, 2003

(54) METHOD OF FORWARDING CHANNEL ASSIGNMENTS FOR ONE OR MORE TRAFFIC CHANNELS

(75) Inventors: Matthew James Dillon, Palatine, IL (US); Bogdan R. Nedelcu, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 507 days.

(21) Appl. No.: 09/612,794

(22) Filed: Jul. 10, 2000

(51) Int. Cl.$^7$ ................................................ H04Q 7/20
(52) U.S. Cl. .................................. 455/452.1; 455/509
(58) Field of Search ................................ 455/422, 519, 455/520, 436, 437, 440, 443, 450, 451, 452.1, 452.2, 509, 512, 513, 62; 370/331–333

(56) References Cited

U.S. PATENT DOCUMENTS

| | | | | |
|---|---|---|---|---|
| 5,325,419 A | * | 6/1994 | Connolly et al. | 455/435 |
| 5,519,760 A | * | 5/1996 | Borkowski et al. | 455/404 |
| 5,570,467 A | * | 10/1996 | Sawyer | 455/515 |
| 5,650,995 A | * | 7/1997 | Kent | 455/508 |
| 5,758,283 A | * | 5/1998 | La Fratta | 455/435 |
| 5,862,476 A | * | 1/1999 | Hasegawa | 455/422 |
| 6,018,657 A | * | 1/2000 | Kennedy et al. | 455/426 |
| 6,061,565 A | * | 5/2000 | Innes et al. | 455/436 |
| 6,201,966 B1 | * | 3/2001 | Rinne et al. | 455/434 |
| 6,205,326 B1 | * | 3/2001 | Tell et al. | 455/406 |
| 6,334,059 B1 | * | 12/2001 | Stilp et al. | 455/456 |
| 6,360,102 B1 | * | 3/2002 | Havinis et al. | 455/457 |
| 6,374,098 B1 | * | 4/2002 | Raith et al. | 455/404 |
| 6,463,279 B1 | * | 10/2002 | Sherman et al. | 455/427 |
| 6,564,049 B1 | * | 5/2003 | Dailey | 455/416 |

\* cited by examiner

Primary Examiner—Nay Maung
Assistant Examiner—Tan Trinh
(74) Attorney, Agent, or Firm—Steven L. Lukasik; Steven A. May

(57) ABSTRACT

A remote unit (101) monitors a control channel for a base station (103) and sends a probe message (301) to the base station (103). The base station (103) forwards the probe message with location information (305) to a controller (115). The controller (115) determines an approximate distance for the remote unit (101). Based on the approximate distance, the controller (115) determines at least one additional site. A channel assignment message (309 or 401) is forwarded to the remote unit (101), which message includes one or more traffic channels associated with at least one of the base station (103) and the at least one additional site.

28 Claims, 3 Drawing Sheets

METHOD OF FORWARDING CHANNEL ASSIGNMENTS FOR ONE OR MORE TRAFFIC CHANNELS

FIELD OF THE INVENTION

This invention relates to communication systems, including but not limited to channel assignments in communication systems.

BACKGROUND OF THE INVENTION

Communication systems are known to comprise an infrastructure, typically including a plurality of base stations, a controller, a home location register (HLR), and a mobile switching center (MSC), that provides communication services to communication units located in corresponding service coverage areas of the base stations. One example of such a communication system is a cellular communication system. In a cellular system, a remote unit (e.g., a mobile or portable radiotelephone) that desires to communicate, sends a channel request message to a base station serving the coverage area in which the remote unit is located. Upon receiving the channel request message, the infrastructure of the cellular system allocates a communication channel for the communication, and the remote unit begins communicating with a telephone network subscriber or another remote unit via the serving base station. Typically, multiple access wireless communication between the base station and the remote stations occurs via radio frequency (RF) channels or communication resources that provide paths over which communication signals such as voice, data, and video are transmitted.

One type of cellular communication system, Code Division Multiple Access (CDMA), utilizes spread spectrum digital technology in order to obtain higher bandwidth efficiency for a given wireless spectrum allocation. CDMA relies on processing power to extract a coded signal embedded across a broad frequency spectrum. In order to extract the desired signal from among many other overlaid unwanted signals, one utilizes the code correlated to the desired signal. The use of coding allows more channels to be derived by the overlaying of carriers one over another and greatly enhances performance in terms of derived channels per Hertz of bandwidth.

Due to the inherent interference caused by the multiple users sharing the same carrier frequency, access or call setup failures are significant in number. In other words, because of the interference caused by the user in its own and neighboring cells, it is difficult for a remote unit to obtain call setup in a reliable manner, thereby resulting in setup failure.

Accordingly, there is a need for a method of providing call setup that is more reliable manner.

DESCRIPTION OF A PREFERRED EMBODIMENT

Figure 1:
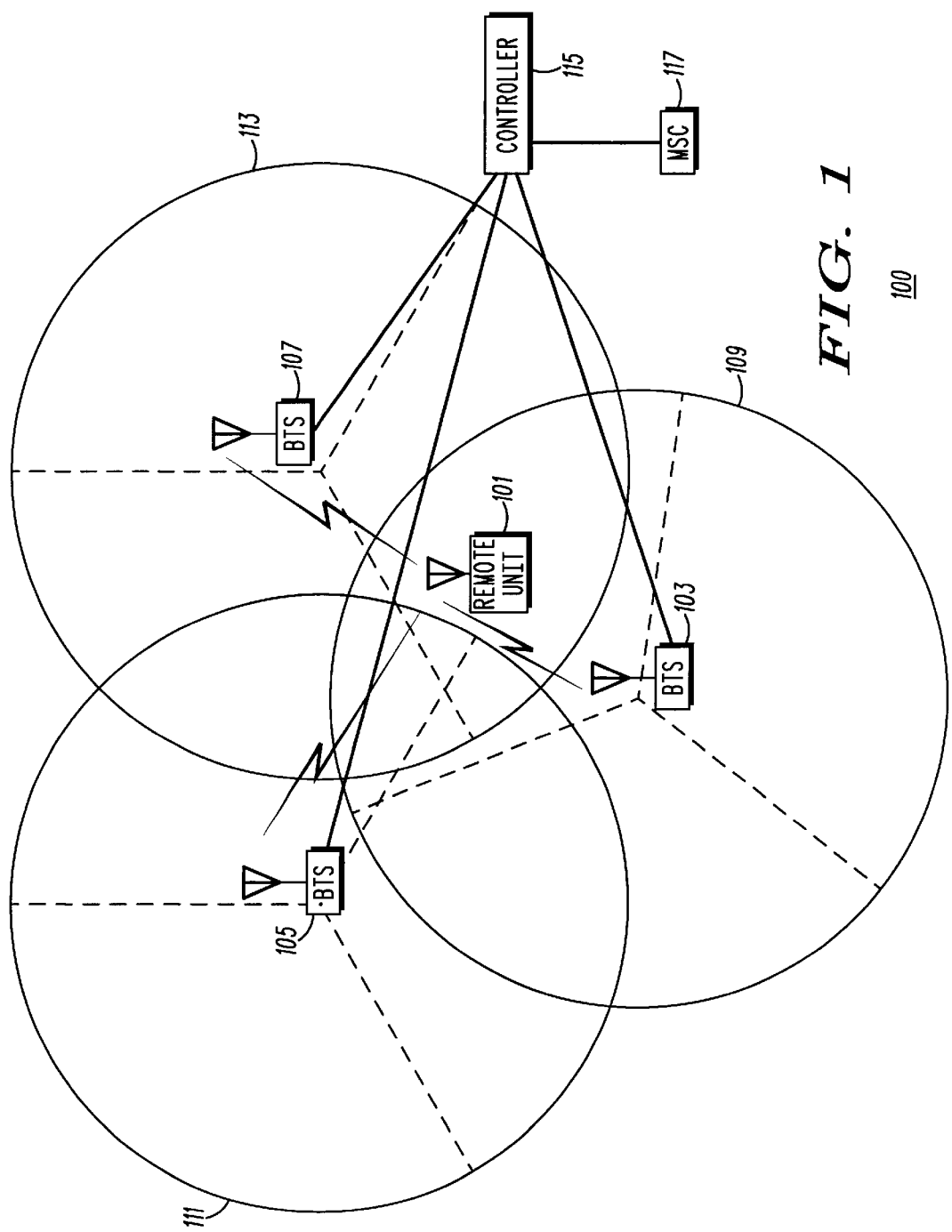
FIG. 1 is a block diagram of a communication system in accordance with the invention.

The following describes an apparatus for and method of setting up a call at multiple sites in order to more reliably setup a call. Based on the location or distance from the originating base site of the call request, one or more additional sites are identified that can simultaneously support the call from its inception. Alternatively, the call may be setup at the originating site, and then immediately engaged in a handoff to the additional sites.

A method of the present invention comprises the steps of a remote unit sending a probe message to a base station; forwarding the probe message with location information to a controller; determining at least one additional site based on the location information; and a channel assignment message is forwarded to the remote unit, which message includes one or more traffic channels associated with at least one of the base station and the at least one additional site.

An alternative method comprises the steps of a remote unit monitoring a control channel for a base station and sending a probe message to the base station. The base station forwards the probe message with location information to a controller. The controller determines an approximate distance for the remote unit. Based on the approximate distance, the controller determines at least one additional site. A channel assignment message is forwarded to the remote unit, which message includes one or more traffic channels associated with at least one of the base station and the at least one additional site.

A method of the present invention, which may be performed by a controller, comprises the steps of receiving, from a base site, a probe message with location information; based on the location information, determining at least one additional site; and forwarding a channel assignment message including one or more traffic channels associated with at least one of the base site and the at least one additional site. The method may further comprise the step of building a list of the at least one additional site in a table for each sector of a base station's coverage area.

A method of the present invention, which may be performed by a base station, comprises the steps of receiving, from a remote unit, a probe message; forwarding the probe message with location information to a controller; and forwarding, to the remote unit, a channel assignment message including one or more traffic channels associated with at least one of the base station and at least one additional site.

Options or alternatives for each of these methods include the following. A list of the at least one additional site may be found in a table for each sector of the base station's coverage area. The one or more traffic channels may comprise a traffic channel for the base station and a traffic channel for each of the at least one additional site. The one or more traffic channels may comprise a traffic channel for the base station. A traffic channel for each of the at least one additional site may be sent in a handoff message. The handoff message may be sent immediately after the remote unit is acquired on the traffic channel for the base station. The probe message may be one of an origination message and a termination message. The location information may comprise distance information from the remote unit to the base station. The controller may determine an approximate location for the remote unit, which approximate location is based on the location information, and wherein the approximate location comprises a sector of the base station's coverage area.

A block diagram of a communication system in accordance with the invention is shown in FIG. 1. A remote unit 101, such as a StarTAC™ cellular phone available from Motorola, Inc., communicates with a system including a plurality of base transceiver stations (BTSs), also known as base stations, 103, 105, and 107 that have three coverage areas 109, 111, and 113, respectively. These base stations 103, 105, and 107, such as model SC9600 or SC604 base transceiver stations available from Motorola, Inc., are in communication with a controller 115, such as Mobility Manager base station controller available from Motorola, Inc., and an MSC, such as an EMX-V switch available from Motorola, Inc. Each base site typically has a sectored coverage area, as shown by the dashed lines, thereby illustrating diversity type reception. In a CDMA system, it is generally preferred for the remote unit 101 to be simultaneously in contact with two or more base stations 103, 105, and 107 in order to heighten the reliability of the received message.

Figure 2:
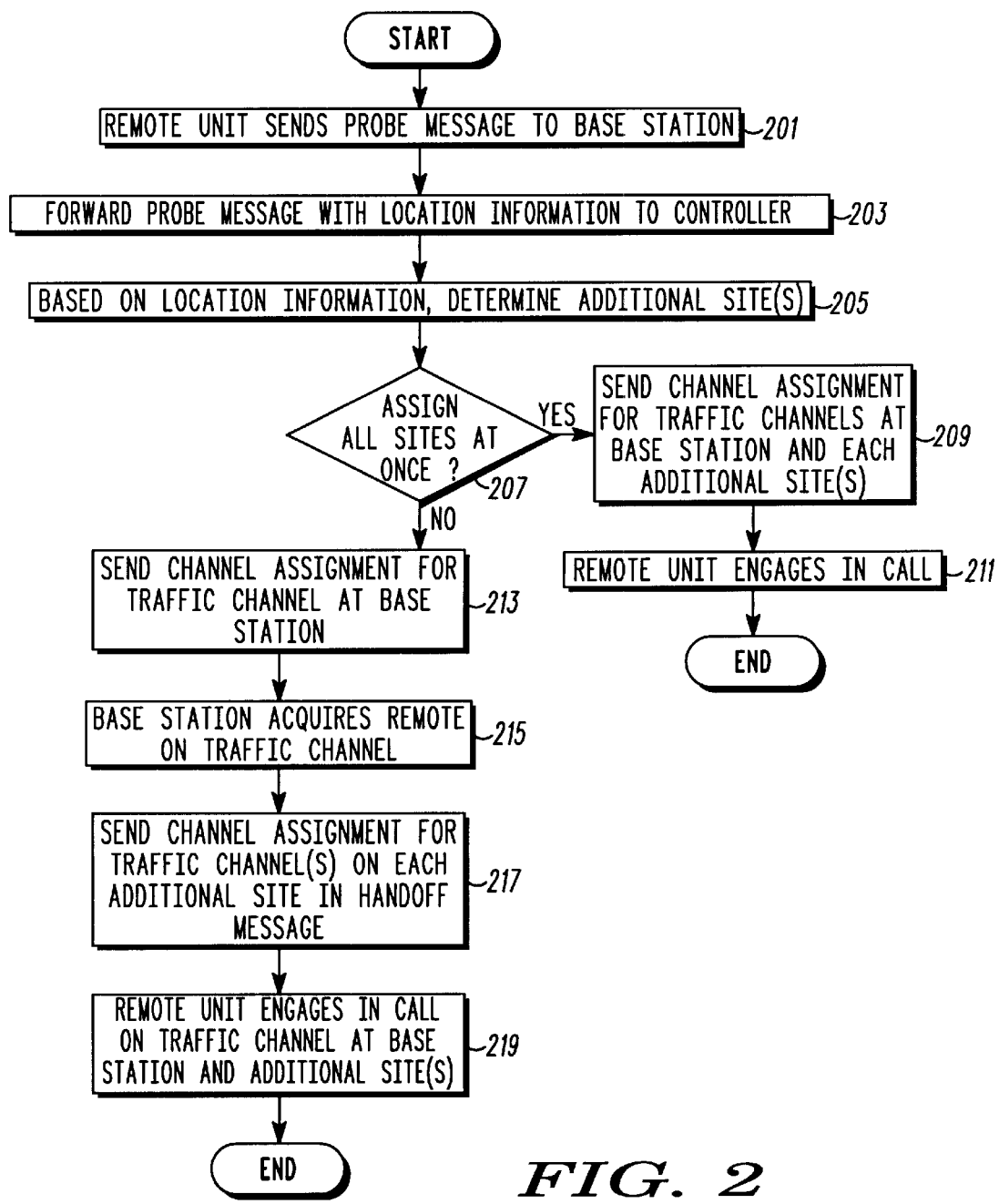
FIG. 2 is a flowchart showing a method of forwarding multiple channel assignments for a single call in accordance with the invention.

A flowchart showing a method of forwarding a channel assignment message for multiple traffic channels is shown in FIG. 2. At step 201, after monitoring a control channel for a base station, a remote unit 101 sends a probe message to that base station 103. The probe message may be an origination message, which is transmitted by the remote unit 101 to request establishment of a connection with the network, or a termination message, which is used by a remote unit 101 to respond to a page that is sent by the network when trying to establish a connection to the remote unit 101, e.g., when a land user calls the remote unit 101. At step 203, the probe message is forwarded with location information to the controller 115. In the preferred embodiment, the base station 103 determines location information for the remote unit 101.

In the preferred embodiment, the location information comprises an estimated distance from the base station 103 to the remote unit 101. In the preferred embodiment, the time of propagation of the signal between the remote unit 101 and each base station is calculated automatically within a correlation receiver. The processing steps involve the transmission of a Pseudo Noise (PN) sequence coded signal time-aligned to under a chip accuracy (e.g., 1/16th of a chip), and correlating to this signal at the receiver using a correlation algorithm. Because the modulation sequence, e.g., a PN sequence, is known and used in synchronization and despreading processes, a precise time of reception of a given chip can be determined. By determining reception time for multiple related signals, a time delay can be calculated and used to determine a distance estimate. In the preferred embodiment, the accuracy of this measurement is approximately 32 meters. Thus, the remote unit 101 can be located on a circle with a radius of ±16 meters. It is this distance that is forwarded to the controller as location information with the probe message at step 203. Alternatively, the location information may comprise a specific location for the remote unit 101, which location may be provided as an x-y coordinate, longitude and latitude, and so forth, such as may be provided by a GPS (Global Positioning System) device, as is known in the art.

At step 205, based on the location information sent at step 203, the controller 115 determines additional sites to the originating site containing the base station 103. These additional sites are sites that, in addition to the originating site with the originating base station 103, may also provide adequate signal quality to the remote unit 101 based on its present location information. The additional sites are likely to be adjacent or neighboring sites to the originating site, although they may not be, depending on the system layout, local terrain, and delays or losses caused by local structures. In the preferred embodiment, an approximate location or distance is determined from the location information sent at step 203. This approximate location is determined as described above. In the preferred embodiment, the location information comprises a distance and a sector (as shown by dotted lines in FIG. 1) of the originating base station 103 in which the remote unit is presently located. In the preferred embodiment, the controller 115 builds a lookup table that contains the distance from step 203, the originating base station 103 identification, the sector from which that remote unit 101 was transmitting, and the PN offsets for that base station 103 and the additional sites identified as being able to service the call request for the remote unit 101. The lookup table is generated by accumulating Pilot Strength Measurement Report Messages (PSMM) that contain information about the pilot strength, expressed in Ec/Io, of the strongest neighbor sectors/cells. The distance information is also measured on the PSMM messages, which helps to identify the neighboring cells that have acceptable signal quality. An example of such a table appears as follows.

| LOCATION/<br>DISTANCE | BTS ID | SECTOR | PN OFFSET | PN SITE 1 | PN SITE 2 |
|---|---|---|---|---|---|
| 1000 m | 150 | 1 | 255 | 258 | 275 |
| 1050 m | 150 | 1 | 255 | 258 | 288 |

In the above table, the BTS ID is an identification of the BTS or base station that is a possible neighbor; the SECTOR is the section of coverage area as designated by dotted lines in FIG. 1; the PN OFFSET is the Pseudo Noise offset value used to identify each sector; PN SITE 1 is the PN OFFSET (258, for example) of the neighbor site that was reported in the PSMM; PN SITE2 is the PN OFFSET of another neighbour site reported in the PSMM. The controller 115 begins assigning one channel (communication resource) simultaneously for all sectors in the lookup table based on the originating base station 103, the distance information, the additional site information, and the sectors in the lookup table.

At step 207, there are two different options for assigning the remote unit to the assigned channels: assigning the remote unit 101 to a channel at each site at the beginning of the call or assigning the remote unit 101 to the originating base site and later handing the unit off to the additional sites. If it is determined at step 207 that the controller 115 will assign all the sites at one time for the remote unit 101, the process continues with step 209, where a channel assignment message is sent to the remote unit for the traffic channels at the base station 103 and at each additional site determined at step 205. The remote unit 101 then engages in the call at step 211, and the process ends. The flow diagram of FIG. 3 illustrates the message sequencing for these steps.

If at step 207 it is determined that all sites will not be assigned to this remote unit at the beginning of the call, the process continues with step 213, where a channel assignment is sent only for a traffic channel at the originating base station 103. At step 215, that base station 103 acquires the remote unit 101 on the assigned traffic channel. At step 217, after detecting the acquisition of the remote unit 101 by the base station 103, a channel assignment for a traffic channel of a base station 105 and 107 on each of the additional sites is sent in a hand-off message. At step 219, the remote unit 101 engages in the call on the traffic channel at the base station 103 and a base station 105 and 107 at each of the additional sites, and the process ends. The flow diagram of FIG. 4 illustrates the message sequencing for these steps.

Figure 3:
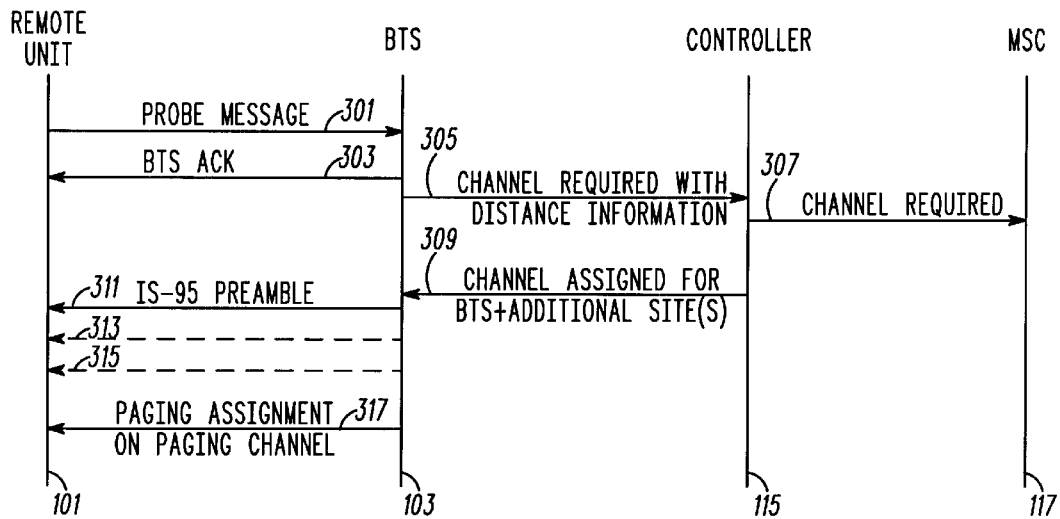
FIG. 3 and FIG. 4 are flow diagrams showing methods of forwarding multiple channel assignments for a single call in accordance with the invention.

A flow diagram or bounce chart of a possible message stream of the present invention is shown in FIG. 3. A probe message 301 is sent from the remote unit 101 to the BTS 103. The base station 103 sends a BTS ACK message 303 back to the remote unit 101, which message 303 informs the remote unit that the base station 103 received the probe message in order to prevent the remote unit 101 from sending the probe message again. The base station 103, after determining the location information, sends a channel required message with location information 305 to the controller 115. The controller 115 determines the required channels and PM offsets to allocate to the remote unit 101 and starts setting up multiple channels for each BTS involved. The controller 115 sends a channel-required message 307 to the MSC 117. The controller 115, after determining the PN offsets, sends a channel assigned message 309 for the originating base station 103 and a base station at each of the additional sites as determined at step 205. In the preferred embodiment, the base station 103 sends IS-95 preamble 311 to the remote unit, and a base station 105 and 107 at each of the additional sites also sends IS-95 preamble in separate messages 313 and 315 to the remote unit 101. Upon target channel designation, a paging assignment message 317 is sent on the paging channel for the originating base station 103, and the call begins.

Figure 4:
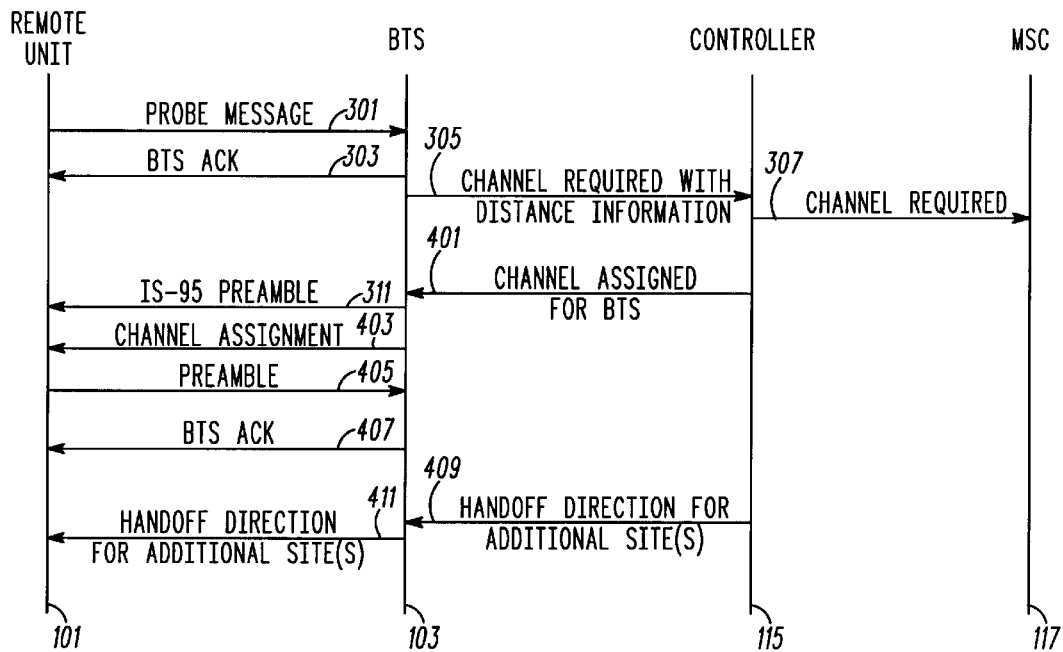

A flow diagram or bounce chart of a possible message stream of the present invention is shown in FIG. 4. This flow diagram represents the situation where the remote unit 101 is set up with the originating base station 103 first, then handed off to the additional sites immediately afterwards, although the sites may be set up prior to the handoff. Messages 301 through 307 are the same as described with respect to FIG. 3. This message stream diverges from that of FIG. 3 at message 401, which is a channel assigned message for the originating base station 103 only. In the preferred embodiment, the IS-95 preamble message 311 is sent only from the originating base station 103 to the remote unit 101, and a channel assignment only to the originating base station 103 is sent in a message 403 to the remote unit 101 from the base station 103. The remote unit 101 responds with a preamble message 405 to the base station 103, which responds with a BTS ACK message 407. Upon detection of the remote unit on the originating base station's 103 traffic channel, the controller sends a handoff direction message 409 for each of the additional sites to the BTS 103, which message is forwarded to the remote unit 101 in a handoff message 411, which message provides handoff for the remote unit 101 immediately to the additional sites chosen by the controller 115. In the preferred embodiment, the controller 115 selects the additional sites upon receipt of the channel required message 305 and sets up the call on the originating site as well as the additional sites. Alternatively, the controller 115 may select only the originating base station 103 to assign the call upon receipt of the channel required message 305 and some time prior to issuing the handoff message 409 select the additional sites.

The present invention provides a more reliable method of setting up a call to avoid call setup failures. By preselecting and setting up in advance more than one channel or communication resource at multiple sites for a single call, a remote unit has a much better chance of achieving call setup without failure. Two alternative methods are provided, one in which all sites are set up at once and another in which the originating site is setup, followed by a handoff to additional sites. The present invention may be implemented solely in the infrastructure of the communication system, thereby avoiding the need to reprogram hundreds of thousands of remote units already in the field. Thus, the invention is particularly useful for CDMA systems using the IS-95A standard, as well as UMTS (Universal Mobile Terrestrial System) standards.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
   sending, by a remote unit, a probe message to a base station;
   forwarding the probe message with location information to a controller;
   based on the location information, determining at least one additional site;
   forwarding, to the remote unit, a channel assignment message including one or more traffic channels associated with at least one of the base station and the at least one additional site.

2. The method of claim 1, wherein a list of the at least one additional site is found in a table for each sector of the base station's coverage area.

3. The method of claim 1, wherein the one or more traffic channels comprises a traffic channel for the base station and a traffic channel for each of the at least one additional site.

4. The method of claim 1, wherein the one or more traffic channels comprises a traffic channel for the base station.

5. The method of claim 1, wherein a traffic channel for each of the at least one additional site is sent in a handoff message.

6. The method of claim 5, wherein the handoff message is sent immediately after the remote unit is acquired on the traffic channel for the base station.

7. The method of claim 5, wherein the handoff message is sent immediately after the remote unit is acquired on the traffic channel for the base station.

8. The method of claim 1, wherein the probe message is one of an origination message and a termination message.

9. The method of claim 1, wherein the location information comprises distance information from the remote unit to the base station.

10. The method of claim 1, further comprising the step of determining, by the controller, an approximate location for the remote unit, which approximate location is based on the location information, and wherein the approximate location comprises a sector of the base station's coverage area.

11. The method of claim 1, wherein the one or more traffic channels comprises a traffic channel for the base station and a traffic channel for each of the at least one additional site.

12. The method of claim 1, wherein the one or more traffic channels comprises a traffic channel for the base station.

13. The method of claim 1, wherein a traffic channel for each of the at least one additional site is sent in a handoff message.

14. The method of claim 13, wherein the handoff message is sent immediately after the remote unit is acquired on the traffic channel for the base station.

15. A method comprising the steps of:
   monitoring, by a remote unit, a control channel for a base station;
   sending, by the remote unit, a probe message to the base station;
   forwarding, by the base station, the probe message with at least one of distance and location information to a controller;

determining, by the controller, an approximate distance for the remote unit;

based on the approximate distance, determining, by the controller, at least one additional site;

forwarding, to the remote unit, a channel assignment message including one or more traffic channels associated with at least one of the base station and the at least one additional site.

16. The method of claim 5, wherein the one or more traffic channels comprises a traffic channel for the base station and a traffic channel for each of the at least one additional site.

17. The method of claim 15, wherein the one or more traffic channels comprises a traffic channel for the base station.

18. The method of claim 15, wherein a traffic channel for each of the at least one additional site is sent in a handoff message.

19. A method comprising the steps of:

receiving, from a base site, a probe message with location information;

based on the location information, determining at least one additional site;

forwarding a channel assignment message including one or more traffic channels associated with at least one of the base site and the at least one additional site.

20. The method of claim 19, further comprising the step of building a list of the at least one additional site in a table for each sector of a base station's coverage area.

21. The method of claim 19, wherein the one or more traffic channels comprises a traffic channel for the base station and a traffic channel for each of the at least one additional site.

22. The method of claim 19, wherein the one or more traffic channels comprises a traffic channel for the base site.

23. The method of claim 19, wherein a traffic channel for each of the at least one additional site is sent in a handoff message.

24. The method of claim 23, wherein the handoff message is sent immediately after the remote unit is acquired on the traffic channel for the base site.

25. The method of claim 19, wherein the location information comprises distance information from a remote unit to a base station.

26. The method of claim 19, further comprising the step of determining, an approximate location for the remote unit, which approximate location is based on the location information, and wherein the approximate location comprises a sector of the base station's coverage area, and determining the at least one additional site from the approximate location.

27. A method comprising the steps of:

receiving, from a remote unit, a probe message;

forwarding the probe message with location information to a controller;

forwarding, to the remote unit, a channel assignment message including one or more traffic channels associated with at least one of the base station and at least one additional site.

28. The method of claim 23, further comprising the step of determining the location information based on a distance from the remote unit to the base station.

* * * * *

UNITED STATES PATENT AND TRADEMARK OFFICE
CERTIFICATE OF CORRECTION

PATENT NO. : 6,628,953 B1  
DATED : September 30, 2003  
INVENTOR(S) : Dillon et al.

It is certified that error appears in the above-identified patent and that said Letters Patent is hereby corrected as shown below:

Column 6,
Line 36, "claim 5", should read -- claim 10 --
Lines 48, 52 and 54, "claim 1", should read -- claim 27 --

Column 7,
Line 9, "claim 5", should read -- claim 15 --

Column 8,
Line 29, "claim 25", should read -- claim 27 --

Signed and Sealed this

First Day of June, 2004

JON W. DUDAS
*Acting Director of the United States Patent and Trademark Office*